United States Patent [19]

Amemiya

[11] Patent Number: 4,482,922

[45] Date of Patent: Nov. 13, 1984

[54] PICTURE SIGNAL READ SYSTEM

[75] Inventor: Takeshi Amemiya, Suginami, Japan

[73] Assignee: Fujitsu Limited, Kawasaki, Japan

[21] Appl. No.: 403,495

[22] PCT Filed: Nov. 11, 1981

[86] PCT No.: PCT/JP81/00329
§ 371 Date: Jul. 14, 1982
§ 102(e) Date: Jul. 14, 1982

[87] PCT Pub. No.: WO82/01798
PCT Pub. Date: May 27, 1982

[30] Foreign Application Priority Data
Nov. 17, 1980 [JP] Japan .................. 55-161740

[51] Int. Cl.³ .................. H04N 1/40; H04N 1/12; H04N 1/17; H04N 1/4
[52] U.S. Cl. .................. 358/282; 358/280; 358/288; 382/51
[58] Field of Search .............. 358/282, 280, 260, 261, 358/288, 293, 294; 382/50-53

[56] References Cited
U.S. PATENT DOCUMENTS
4,247,873  1/1981  Decuyper ..................... 358/282
4,272,789  6/1981  Biron ........................ 358/282

FOREIGN PATENT DOCUMENTS
50-50810   5/1975  Japan .
52-151513 12/1977  Japan .
53-41920   4/1978  Japan .
53-118917 10/1978  Japan .

Primary Examiner—Howard W. Britton
Attorney, Agent, or Firm—Staas & Halsey

[57] ABSTRACT

This invention proposes a picture signal read system for facsimile equipment which reads picture data while the manuscript is being shifted when the send time of a line is short.

When reading picture data while shifting the manuscript paper, the amount of charges accummulated by the image sensor becomes insufficient. In such a case, discrimination of picture signals with a fixed threshold level TH may cause misreading of picture data. For this reason, the threshold level control circuit is provided in order to shift the threshold level in accordance with the send time of a line.

12 Claims, 9 Drawing Figures

PICTURE SIGNAL READ SYSTEM

BACKGROUND OF THE INVENTION

The present invention relates to a picture signal readout system in the facsimile equipment and so on Furthermore, it relates to a readout system which can read picture data while a manuscript is being shifted.

Figure 1:
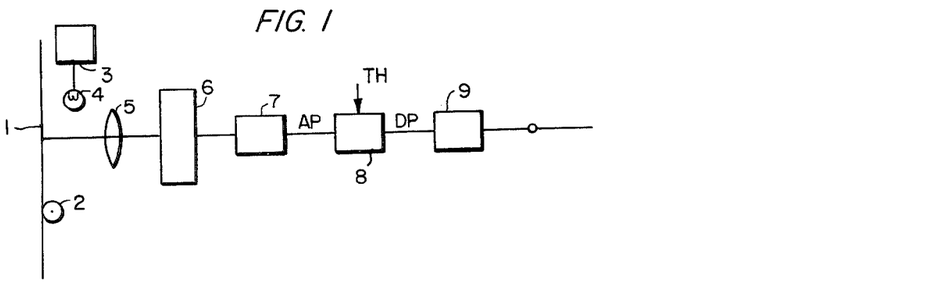
FIG. 1 outlines the block diagram of existing facsimile equipment.

FIG. 1 outlines an example of an existing facsimile transmitter. In FIG. 1, picture data of a manuscript 1 which is irradiated by the lighting source 4 having the power supply 3 and fed by the roller 2 is read for a line by the CCD (Charge Coupled Device) image sensor (photo-electric conversion element) 6 via the lens 5, amplified by the amplifier 7 after photo-electric conversion and then input to the discriminator 8 as the analog picture signal AP. The discriminator circuit 8 compares the received analog picture signal AP with the discrimination level signal TH which discriminates black and white level, and outputs the digital picture signal DP of logic "1" considering the analog picture signal AP higher than said discrimination level signal TH as the white signal W and the digital picture signal DP of logic "0" considering the analog picture signal AP lower than the discrimination level signal TH as the black signal B. The digital picture signal DP output from the discrimination circuit 8 is input to the picture signal processor 9 and then transmitted to the transmission path via the modulator.

Such facsimile equipment is provided with following means in order to omit transmission of the picture data of the blank portion in view of improving the transmission rate of manuscripts.

Namely, the picture data as many as one line is read by the image sensor 6 indicated in FIG. 1, and this one line length is divided into predetermined number of blocks and it is discriminated whether the black signal B exists or not in each block divided. The block not including the black signal B is not transmitted as the picture signal and only the block including the black signal B is transmitted as the picture signal.

Such existing facsimile equipment has an advantage that the picture signal of the blank portion is not transmitted and the transmission time can be curtailed as much and thereby the send time can also be shortened.

However, above means brings about following disadvantages.

Namely, the image sensor 6 indicated in FIG. 1 cannot read picture data momentarily but, reads within a predetermined period, and the time for starting read of picture data is specified by the time for sending the preceding line data to the transmission path. When the preceding line data is transmitted, it is immediately required to transfer the data read by the image sensor 6 but, the read time of the image sensor 6 is constant and may be longer than the transmission time of the preceeding line.

On the occasion of reading picture data by the image sensor 6, the paper is fed as much as the width of one scanning line from the preceding line by the roller 2 and when the manuscript stops, data is read. However, if the time for sending data of preceding line is short as explained above, this situation may sometimes require extra time for the image sensor 6 to start read of picture data from the interim time during paper feed. Particularly, when the preceding line is all white, the time required for sending the data of preceding line to the transmission path becomes the shortest and situation may some time make it impossible for the image sensor 6 to read accurately the picture data of the next line of the manuscript having been fed.

Figure 2:
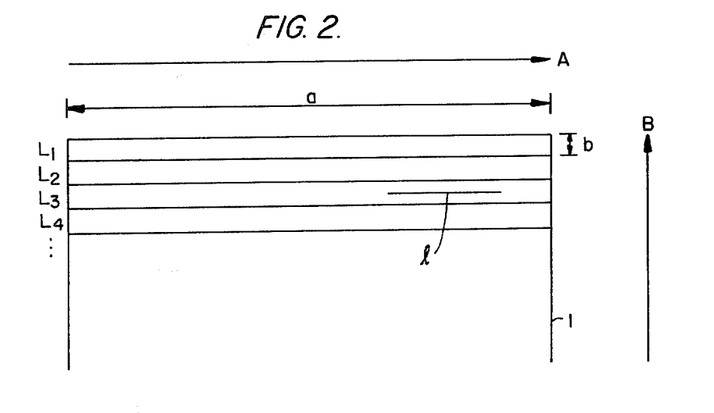
FIG. 2 illustrates the main and sub scannings.

Such process is explained using FIG. 2. FIG. 2 shows the conditions of main scanning and sub-scanning of the manuscript 1 indicated in FIG. 1. In this figure, the main scanning is carried out in the direction indicated by the arrow A and the image sensor reads picture data of the lines in this direction. The lines $L_1$, $L_2$, $L_3$, ... are read in this sequence. The arrow B indicates the sub-scanning direction and each paper feed moves the paper in the length indicated by b. Therefore, the image sensor reads picture data in the area ab formed by the length a of main scanning and the width b as the picture data of respective lines.

In the abovementioned transmission method of picture signal, the transmission time for picture data of blank portion is curtailed and the send time can be also curtailed. For example, the picture data of the line $L_2$ is read during the period of send processing for the picture data of line $L_1$. Moreover, the manuscript 1 for reading picture data of the line $L_2$ is moved simultaneously with start of send processing for the line $L_1$.

This means that it is required for reading picture data of the line $L_2$ to move the line $L_2$ to the position of image sensor by the sub-scanning and to read picture data of the line $L_2$ during the period T from start to end of send processing for line $L_1$.

In such a case, the sum of times of sub-scanning for paper feed and read time of image sensor 6 may become longer than the period T. Thereby, data read by image sensor 6 is started simultaneously with the sub-scanning. In this supposition, the picture data of line $L_3$ is read during the period of sending picture data of line $L_2$ as the abovementioned read condition. In this case, the sending process period becomes shortest since the line $L_2$ is all white. Therefore, data read by image sensor 6 is started simultaneously with the sub-scanning. At this time, the image sensor 6 reads picture data of the line $L_3$ including the black picture data l.

However, since data read is carried out during sub-scanning, the read area becomes wider than the area ab and may become 2ab (line $L_2$ and line $L_3$) in the worst case. In such a case, picture data of black indicated by l in the line $L_3$ causes a discrimination error to occur because a difference in amount of charges corresponding to the picture data of black and white among those to be stored in the image sensor 6 becomes small since such picture data occupies relative a smaller rate in the data read area, and resultingly picture data of black l in FIG. 2 cannot be transmitted.

Figure 3A:
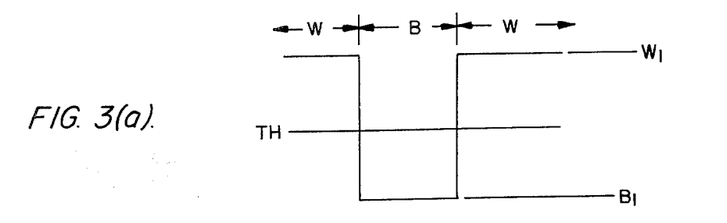
FIG. 3 illustrates reading of picture data.

This is explained upon reference to FIG. 3. FIG. 3 indicates an output of the image sensor 6. In the case of ordinary output, As shown in FIG. 3(a), there is a sufficient signal level difference between the picture data of white $W_1$ and the picture data of black $B_1$ in the ordinary output and resultingly the signal is accurately discriminated into the white signal W and black signal B by the threshold level TH.

Figure 3B:
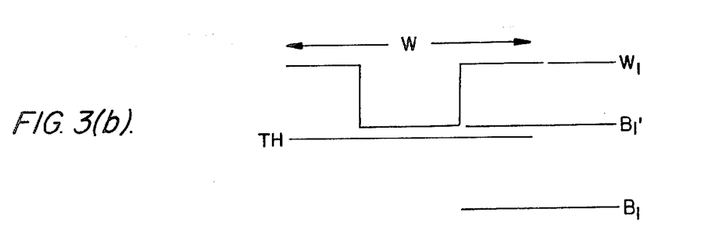

But as in the case of reading the picture data of the line l indicated in FIG. 2 as explained above, a signal level difference between the picture data of black $B_1'$ and picture data of white $W_1'$ becomes small as indicated in FIG. 3(b) and it can no longer be read by the threshold level TH. In this case, picture quality to be transmitted is deteriorated. Existingly, following measures have been taken in order to prevent deterioration of picture quality resulting from such cause.

(1) The read time of image sensor 6 is curtailed by irradiating a manuscript with a large amount of light.

(2) A manuscript is fed by driving mechanism with a motor having a large torque in view of realizing high speed feed of manuscript. Thereby the moving rate of manuscript is curtailed and picture data is read while the manuscript is in the stationary condition.

However, in the case of (1), it is required to used a specially designed lighting device in order to irradiate a manuscript with a large amount of light and also to use a specially designed power supply which is independent of that of the facsimile equipment, thus resulting in such disadvantage that the system becomes large in size and uneconomical. Moreover, in the case of (2), driving by a motor is always accompanied by noise and an economical disadvantage. It is also inferior to the facsimile system.

DISCLOSURE OF INVENTION

It is an object of the present invention to provide a system which economically reads picture data with simplified structure while a manuscript is being fed.

In order to attain such object, the present invention discloses a picture signal read system where a manuscript is fed by as much as the width of a main scanning line for each line in the subscanning direction, the white level and black level of a picture signal obtained by reading picture data of the manuscript in the main scanning direction are detected in accordance with a predetermined threshold level and only the block containing a black level picture signal is transmitted after detecting the existence of the black level picture signal for each block obtained by dividing one scanning line into a predetermined number of blocks, thus characterized in that the threshold level in the next scanning is shifted and the picture data is read while feeding the manuscript in the subscanning direction, in case the number of blocks including the black level signal is less than the predetermined number.

DESCRIPTION OF THE PREFERRED EMBODIMENT

An embodiment of the present invention is explained with reference to the given drawings.

Figure 4:
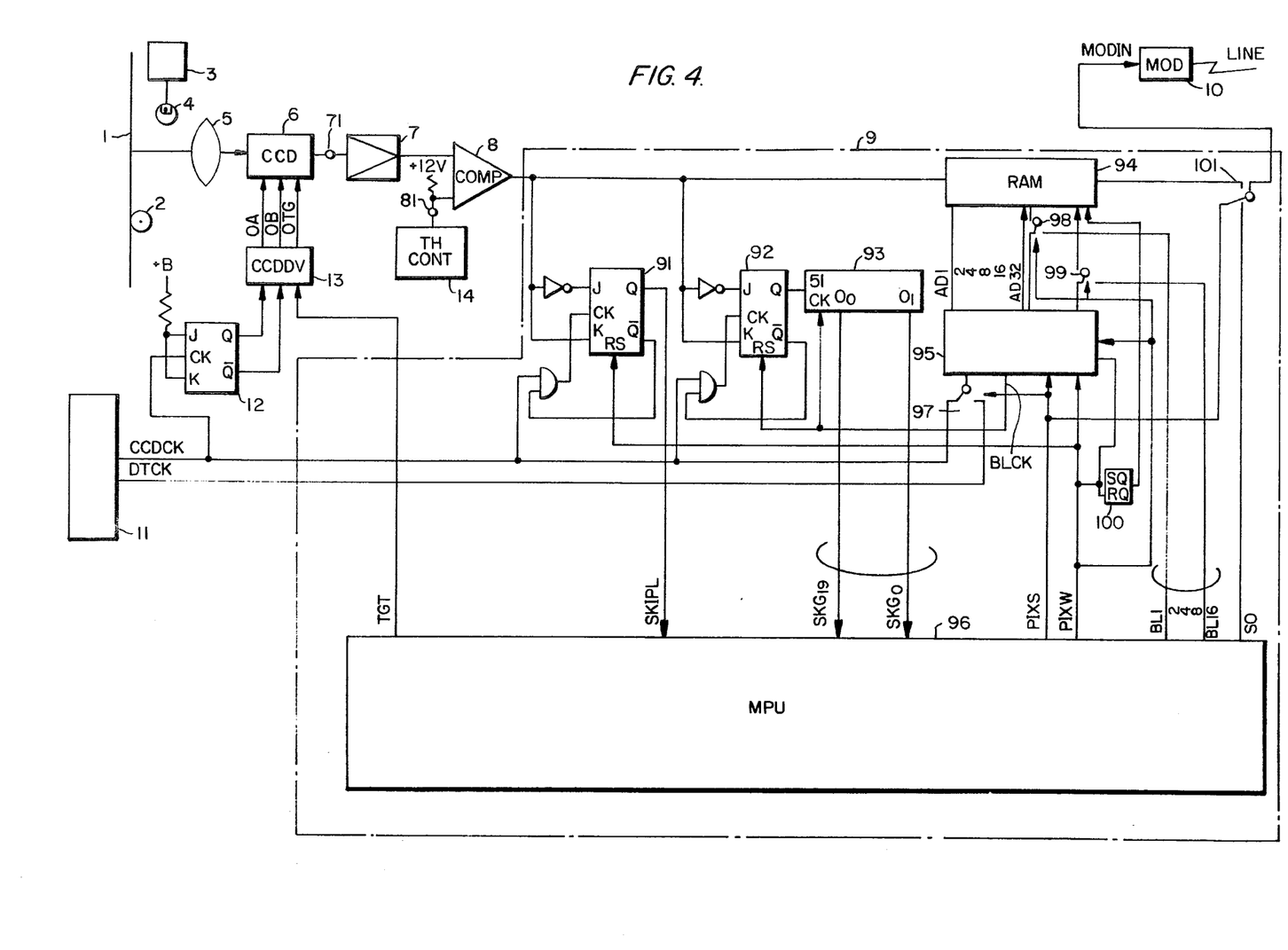
FIG. 4 indicates an embodiment of the present invention.

The structure and operation of facsimile equipment adopting the present invention is explained with reference to FIG. 4. FIG. 4 is block diagram of an embodiment of the present invention. In this figure, 1 is a manuscript; 2 is the paper feed roller; 4 is the light source having a power supply 3; 5 is a lens; 6 is an image sensor such as CCD (Charge Coupled Device); 7 is an amplifier; 8 is a comparator; 9 is a picture signal processor; 10 is a modulator; 11 is a clock generator; 12 is the J-K flip-flop circuit (J-K FF); 13 is a voltage convertor; 14 is a threshold level control circuit.

Reference numerals 91 and 92 in the picture signal processor 9 are J-K flip-flop circuits (J-K FF); 93 is a shift register; 94 is a random access memory (RAM); 95 is an address counter; 96 is a microcomputer (MPU); 97, 98, 99, 101 are switch circuits; 100 is a flip-flop circuit.

In FIG. 4, a manuscript 1 fed by the roller 2 is inrradiated by the light source having power supply 3 and thereby the image sensor 6 detects picture data via the lens 5.

Figures 5, 6:
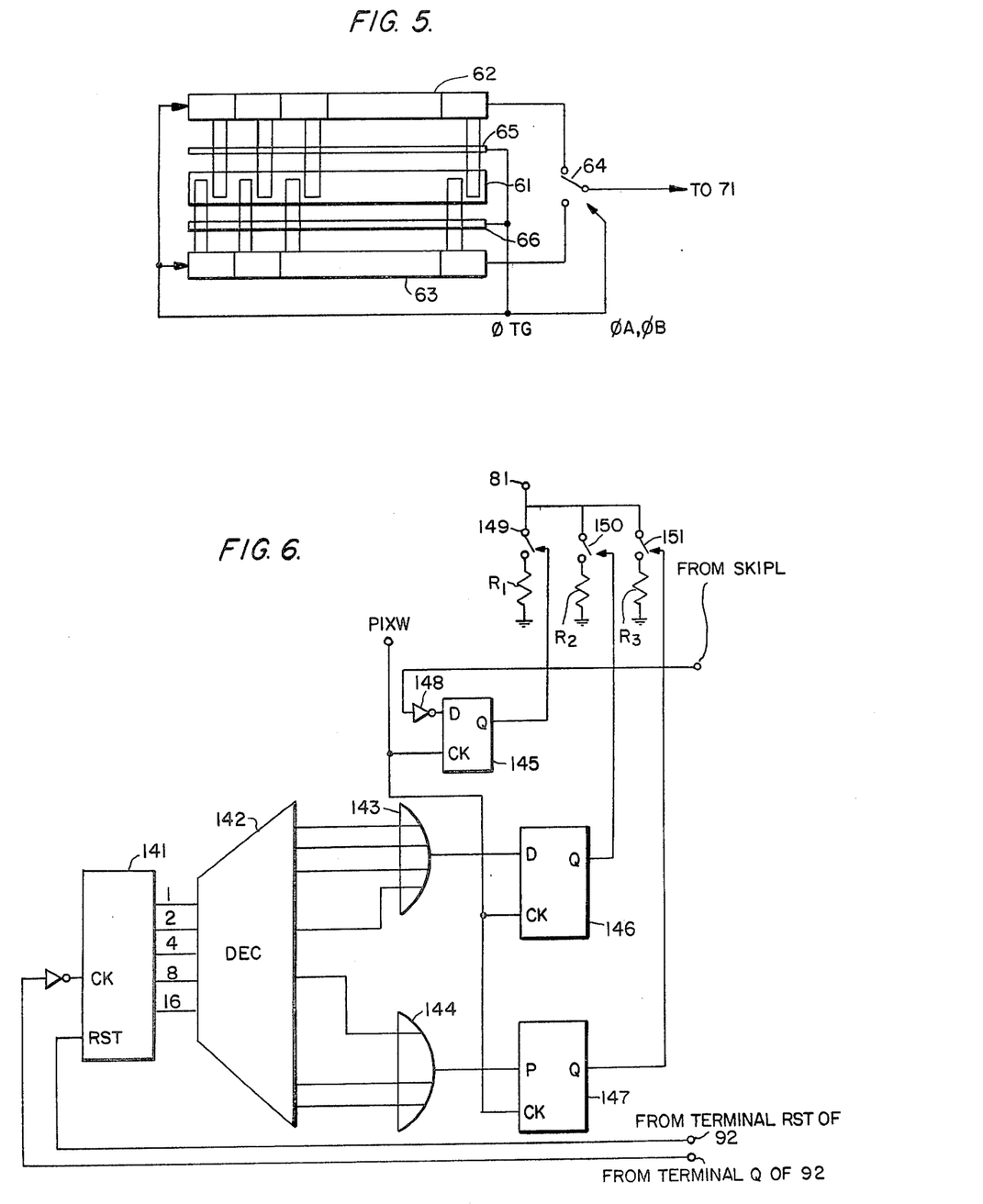
FIG. 5 indicates an image sensor (CCD) shown in FIG. 4.
FIG. 6 indicates the structure of the threshold level control circuit shown in FIG. 4.

The structure of image sensor (CCD in this embodiment) 6 is shown in FIG. 5. In this figure, 61 is a photo-sensor; 62, 63 are shift registers; 64 is a switch circuit; 65, 66 are transfer gate for transferring charges.

A picture data input to the photo-sensor 61 is converted, within a predetermined period, into charges in accordance with the amount of light and then transferred to the shift registers 62, 63 by a clock $\phi_{TG}$ at the predetermined time as explained later. In this embodiment, the picture data in both shift registers 62, 63 can be counted up to 1216 in total. The charges transferred to the shift registers 62, 63 are sent to the input terminal 71 of an amplifier 7 as the data for each shift register. The transfer clocks $\phi_A$, $\phi_B$ are mutually inverted clocks in the opposite phases which connect the output terminals of shift registers 62, 63 alternately to the input terminal 71 of the amplifier 7 by driving the switch circuit 64.

The signal thus sent to the amplifier 7 is amplified and input to the comparator 8. The comparator 8 compares the signal level sent from the amplifier 7 with the predetermined threshold level and outputs either logic 1 as the white signal W when the input signal is higher than the threshold level or logic 0 as the black signal B when the input signal is lower than the level, to the picture signal processor 9.

At this time, the threshold level applied to the pertinent comparator 8 is controlled by the threshold level control circuit 14. The object of the present invention is attained by such threshold level control but this operation is explained in detail by referring to FIG. 6.

The picture signal processor 9 which receives the white signal W and the black signal B respectively as the logic 1 and logic 0 carries out the operations explained below.

Figure 7A:
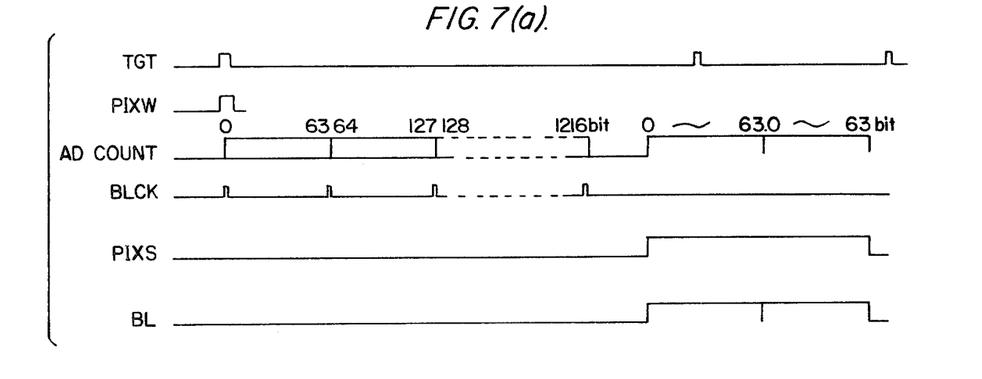
FIG. 7 is the time chart for explaining FIG. 4 to FIG. 6.

The micro-computer MPU 96 outputs the signal PIXW indicated in FIG. 7, instructing entry of the signal sent from the comparator 8 into the random access memory 94 via the flip-flop circuit 100. At this time, the signal PIXW is input to the address counter 95. The address counter 95 starts counting in order to count 1216 picture data output from the image sensor 6. This counting is indicated as AD COUNT in FIG. 7(a). Upon completion of counting 1216 picture data, the address counter 95 outputs a reset signal to the flip-flop 100. Thereby an output of flip-flop 100 is inverted, thus completing data entry into RAM 94.

On the other hand, an output of comparator 8 is also applied to the JK-FF 91 and 92. The JK-FF 91 detects that a line is all white, namely has the all-white line detecting function, while JK-FF 92 detects in which block the all-white signal representing all white signals exists among those obtained by dividing a line into the predetermined blocks, namely has the all-white block detecting function.

First, the operation of JK-FF 91 is explained. The signals sent from the comparator 8 are respectively input to the J, K terminals of JK-FF 91 as the logic 1 and logic 0 signals. Since the logic 1 represents the white signal W and logic 0 the black signal B, if all of the 1216 bits are white signals W, an output of the output terminal Q when the 1216 bits are all input to the JK-FF 91 is the logic 0. If a black signal B exists, even a bit, within 1216 bits, an output of the output terminal Q when 1216 bits are all input is the logic 1. This is because if a black signal B exists even a bit, an output of $\overline{Q}$ terminal changes to 0 from 1 and the clock sent from the clock generator 11 is blocked by the AND gate to which the output of the $\overline{Q}$ terminal is applied. Thereby holding the inverted condition. Therefore, the MPU 96 discriminates whether the black signal B exists or not in 1216 bits from an output sent from the Q terminal of JK-FF 91. According to the result of discrimination, it is judged whether the all-white skin signal should be generated or not, as explained later.

In this embodiment, as explained previously, one line of 1216 bits is divided into a predetermined number of blocks. In this embodiment, a line is divided into 19 equal blocks and each block is composed of 64 bits. Here, the JK-FF 91 sends the detected signal to the SKIPL terminal of MPU 96 after detecting whether a block is all-white and the MPU 96 generates the sending signal based on such data.

Operation of JK-FF 92 is similar to that of JK-FF 91. The signal input to the reset terminal of JK-FF 92 is the signal BLCK which is output after every 64 bits from the address counter 95. On the other hand, the signal obtained every 1216 bits is the reset signal for JK-FF 91. Thus, the signal which has detected all-white block or not for every 64-bits namely every block is input to the shift register 93 and thereafter input to the terminals SKG0 to SKGn of the MPU 96.

Figure 7B:
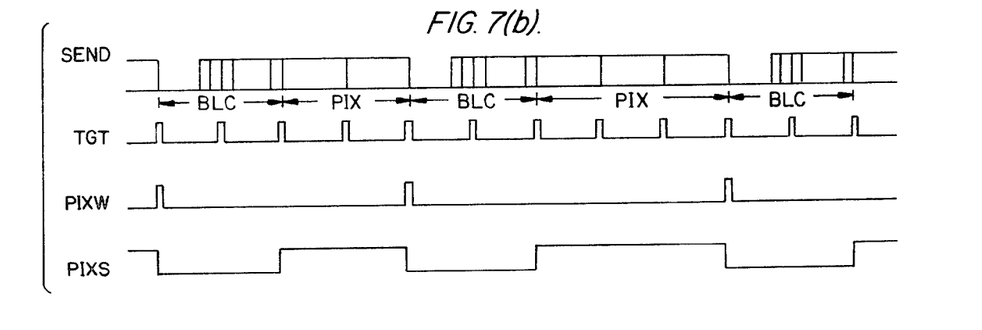

The MPU 96 generates the send signal on the basis these signals and applies the send signal to the modulator 10. FIG. 7(b) indicates the send signal SEND. In this figure, the time axis is compressed as compared with that in FIG. 7(a).

The send signal SEND is composed of the signal BLC which indicates in which block among 19 blocks the black signal B exists and the signal PIX which indicates where the black signal B exists among the blocks (64 bits) judged as including the black signal B.

The signal BLC is composed of the heading dummy signal of several milli-second, followed by the all-white indication signal SKIPL which indicates whether one line, 1216 bits are all white signal or not and the signals BL0 to BLn which indicate the block including the black signal B.

When the signal PIXW, which instructs entry to RAM 94, is output from the MPU 96 to initiate data entry, the MPU 96 generates the send signal within the time that the dummy signal exists and the signal BLC is output from the MPU 96. At this time, the switch circuit 101 is connected to the terminal SO of MPU 96 in accordance with the signal PIXS.

When the signal PIX appears following the signal BLC, the switch circuit 101 is connected to the output side of the RAM 94 in accordance with the signal PIXS and the signal PIX indicating existence of the black signal B is input to the modulator 10.

At this time, control is carried out as follow by the signal PIXW, signals BL1 to 16, and the switch circuits 98, 99.

The MPU 96 discriminates the blocks which are not all-white block depending on the all-white block data sent from the shift register 93; outputs simultaneously, the number from the BL 1 to BL16 lines and the PIXS signal; changes the clock of address counter 95 to the send clock (DTCK) and moreover changes the data input signal (MODM IN) of the modulator 10 to the RAM output by means of the switch circuit 97. The MPU 96 then reads the 64 bit picture signal of the block specified by the BL 1 to BL 16 from the RAM output and applies it as the send data to the modulator 10. Similar operations are repeated for each block that is not all-white.

Upon completion of this operation, the same operation is repeated for the successive lines.

The signal TGT in FIG. 7(b) instructs the image sensor 6 to accummulate charges for reading picture data. This signal causes the image sensor to discharge at a predetermined period, because if the charges are accummulated continuously, it is charged up to the level indicating the black signal B, resulting in discrimination error in the white signal W.

The clock generator 11 outputs the clock CCDCK (331 kHz in this embodiment) to be supplied to the system of image sensor 6 and the clock DTCK (7.8 kHz in this embodiment) to be supplied to the address counter. This clock is supplied to the address counter 95 through the changeover operation of switch circuit 97 depending on the signal PIXS sent from the MPU 96, for the picture signal processing.

The JK-FF 12 is provided for generating the clocks $\phi_A$, $\phi_B$ to be supplied to the CCD used as the image sensor 6.

The voltage convertor 13 converts the logic circuit voltage of 5 V to the analog circuit voltage of 13 V.

Figure 8:
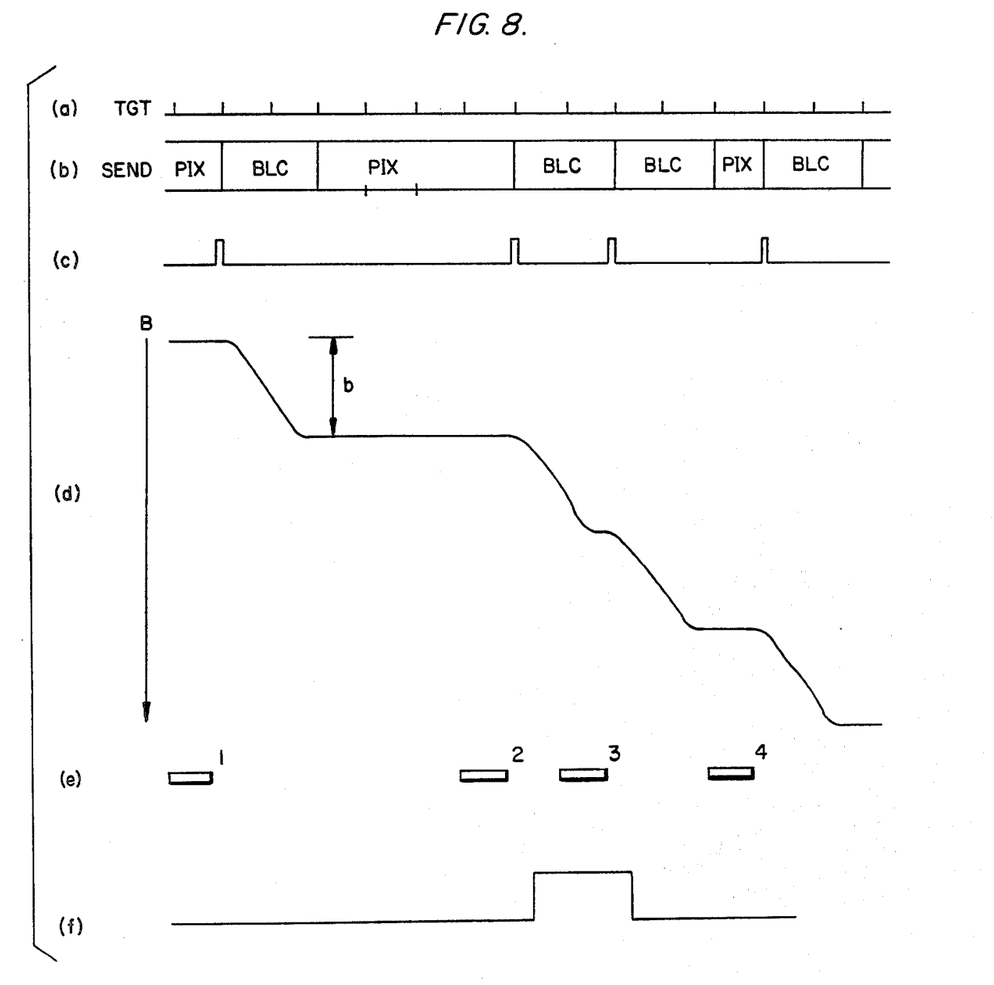
FIG. 8 and FIG. 9 illustrate the timing of the present invention.

The relation between the paper feed in such facsimile equipment, namely the sub-scanning and the picture data read by image sensor in the main scanning direction is shown in FIG. 8.

In this figure, (a) is the charge accummulation instruction signal TGT for the image sensor shown in FIG. 4, (b) is the send signal to be sent to the transmission path, (c) is the subscanning instruction signal which instructs start of subscanning to the motor, (d) is the shift line indicating the shift of manuscript, (e) is the image sensor read time, (f) is the time chart indicating change of threshold level. In (d), B indicates the subscanning direction.

FIGS. (a), (b) are respectively the same as the signals TGT, SEND in FIG. 7. The subscanning instruction signal (c) is generated in synchronization with the signal TGT simultaneously with start of the SEND signal. The manuscript is fed for the constant distance b from the point where the subscanning signal (c) is generated as indicated by the shift line in (d) and then stops. The read time (d) of the image sensor 6 exists only during the period of signal (a) just before generation of the subscanning instruction signal (c). In 1, 2, 4 of signal (e), data is read with the manuscript in the stationary condition, but in 3, data read is started while the manuscript is being shifted (subscanning). This is because the signal send processing time is curtailed since the preceding line is all-white.

In such a case, discrimination error of the white picture signal W and the black picture signal B may be probable as explained in FIG. 3.

In the case of the present invention, the threshold level for discriminating the white signal W and the black signal B is changed in order to prevent such discrimination error. A change of threshold level is shown in FIG. 8(f). Namely, in such a case, required is only bringing the threshold level close to the level of white picture data, since the occupation rate of black picture data per unit area is reduced.

The control circuit for this purpose is shown in FIG. 6. This figure indicates the structure of threshold level control circuit 14 shown in FIG. 4.

In this figure, 141 is a counter; 142 is a decoder; 143, 144 are OR circuits; 145, 146, 147 are flip-flop circuits; 148 is an invertor; 149, 150 are switch circuits; $R_1$, $R_2$, $R_3$ are resistors.

The counter 141 inputs the signal sent from the terminal Q of JK-FF 92 to the clock terminal CK, and the signal sent from the reset terminal RST of JK-FF 92 to the reset terminal RST. Since the JK-FF 92 outputs the logic 1 for each all-white block from the Q output terminal, the number of blocks which are not all-white can be counted by inputting such logic 1 signal after it is inverted by the invertor to the counter 141. The signal of counter 141 is input to the OR circuits 143, 144 via the decoder 142 and respectively input to the terminal D of the flip-flop circuits 146, 147.

The flip-flop 145 inputs the signal SKIPL to the terminal D via the invertor 148 and the signal PIXW is input to the clock terminal CK of respective flip-flop circuits.

Thereby, when the number of blocks of not all-white is insufficient, an output signal appears from the flip-flop 145 when it is within the range of predetermined number, or from the flip-flop 147 when it is within the range of next predetermined number, turning on the switch circuits 149, 150 and 151 respectively. At this time, the voltage to be input to the input terminal 81 of the comparator 8 is changed in accordance with different resistance values of $R_1$, $R_2$ and $R_3$. Thereby, the reference voltage of comparator 8 can be controlled in accordance with the number of blocks which are not all-white.

Such control is effective for controlling the threshold level of the comparator 8 corresponding to the processing time of the SEND signal. This process is explained with reference to FIG. 9.

Figure 9A:
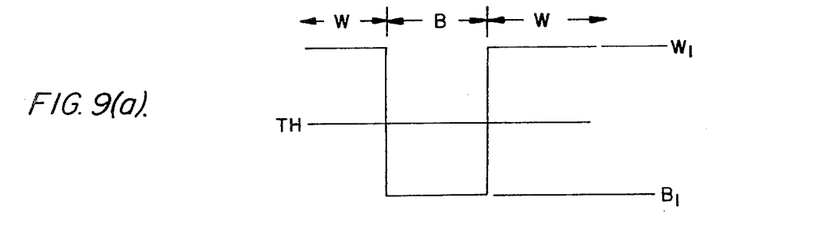
Figure 9B:
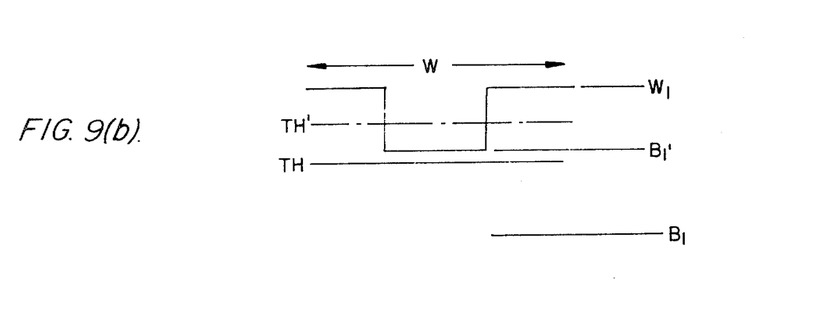

Usually, as shown in FIG. 9(a), the white signal W and the black signal B are discriminated with the specified threshold level TH. But in case the SEND signal is not sufficient in amplitude as in the case of transmission of picture data of an all white line, the threshold level is shifted to TH' from TH as shown in FIG. 9(b) via the control described above. Such control is performed by the threshold level control circuit shown in FIG. 6. Thereby, misreading of picture data can be prevented and picture data can be transmitted without any deterioration of quality.

I claim:
1. A picture signal read system comprising:
read means for reading the contents of a document line by line and for providing a picture signal for each line of the document, the picture signal being responsive to said contents of the document;
conversion means for comparing said picture signal with a predetermined threshold level and for converting the picture signal into a binary picture signal in accordance with the contents of the documents, the binary picture signal having a white level and a black level;
divide means for dividing the binary picture signal of each line scanned by said read means into a plurality of blocks;
detecting means for detecting the presence of a black level signal in the block and for providing a detect output responsive to said detecting a black level;
send means for sending, in accordance with said detect output, only the picture data corresponding to the block containing the detected black level signal;
count means for counting each block containing a black level signal; and
control means for changing said threshold level in accordance with the number of counted blocks.

2. A picture signal read system according to claim 1, wherein said divide means further includes means for providing a block signal responsive to said dividing, and
said detecting means includes white means responsive to said block signal for detecting a block containing all white level signal and for providing a white signal each time such a block is detected, and wherein
said count means includes means responsive to said white signal, for counting each block containing all white level signal.

3. A picture signal read system according to claim 1, wherein said control means comprises:
a resistor network having an output corresponding to said threshold level; and
switch means, operatively connected to said resistor network, for varying the resistance of said resistor network to vary said threshold level.

4. A picture signal read system according to claim 1, wherein said count means further provides a count output responsive to said counting, and wherein
said system further includes decoder means for providing a decode signal repsponsive to said count output, and wherein
said control means varies said threshold level in accordance with said decode signal.

5. A picture signal read system according to claim 1, wherein said threshold level has a reference level and said control means includes switch means for varying the threshold level to a level higher than the reference level in accordance with the number of blocks containing the black level signal counted by said count means.

6. A picture signal read system according to claim 1, wherein said control means includes:
means for providing a scanning start signal to initiate the reading of a line of said document;
a plurality of resistors operatively connected to provide said threshold level; and
switch means for selectively connecting respective ones of said resistors in synchronization with said scanning start signal, to vary said threshold level.

7. A picture signal read system comprising:
read means for scanning and reading the contents of a document line by line and for providing a picture signal having a black level and a white level, the picture signal varying in accordance with the contents of said document;
discriminating means for comparing said picture signal with a predetermined threshold level and discriminating whether said picture signal is a white level or a black level;

detecting means, operatively connected to said discriminating means, for detecting when the picture signal corresponding to a line of said document is an all white level;

transmission means for transmitting data varying in accordance with the contents of said document;

line skip means, operatively connected to said transmission means and to said detecting means, for blocking transmission of the picture signal corresponding to a line of said document when said picture signal is an all white level; and control means for providing said threshold level and for varying said threshold level in accordance with said detecting means detecting the picture signal of a line being all white.

8. A picture signal read system according to claim 7, wherein said control means includes means for providing a scanning start signal to initiate the reading of a line of said document, and wherein said detecing means includes a flip-flop reset by said scanning start signal and set when said discriminating means discriminates that said picture signal includes a black level.

9. A picture signal read system according to claim 7, wherein said control means includes:

means for providing a scanning start signal to initiate the reading of a line of said document, and wherein said detecting means includes white means for detecting when the picture signal contains an all white level and providing a white signal each time such a picture signal is detected, and said control means includes switch means for varying said threshold level in synchronization with said scanning start signal and in accordance with said white signal.

10. A picture signal read system comprising:

scanning means for scanning a document line by line and for providing a picture signal for each line of the document, said picture signal having a black level and a white level and varying in accordance with the contents of the document;

send means for transmitting said picture signal within a transmission time;

conversion means for comparing said picture signal with a predetermined threshold level and for converting the picture signal into a binary picture signal in accordance with the predetermined threshold level;

detecting means for detecting the transmission time of a binary picture signal corresponding to a line of said document, and detecting when the transmission time is shorter than a predetermined reference time, and for increasing the threshold level in accordance with the detected transmission time.

11. A picture signal read system according to claim 10, further comprising:

divide means for dividing the binary picture signal of each line into a plurality of blocks;

black detecting means for detecting the presence of a black level in a block and for providing a detect output responsive to said detection of a black level signal;

counting means for counting the number of blocks containing a black level signal;

means for determining when the number of blocks containing a black level signal is smaller than a predetermined number, for providing a lower output responsive to the number of blocks being smaller than the predetermined number, and for varying the threshold level in accordance with said lower output.

12. A picture signal read system according to claim 10, wherein said detecting means further includes white detecting means for detecting when a picture signal contains all white level and for providing a white signal each time such a picture signal is detected.

* * * * *

UNITED STATES PATENT AND TRADEMARK OFFICE
CERTIFICATE OF CORRECTION

PATENT NO. : 4,482,922
DATED : November 13, 1984
INVENTOR(S) : AMEMIYA

It is certified that error appears in the above-identified patent and that said Letters Patent is hereby corrected as shown below:

Column 2, line 45, "l" should be --$\ell$--;
          line 63, "l" should be --$\ell$--.
Column 5, line 21, "skin" should be --skip--.

Signed and Sealed this

Sixteenth Day of April 1985

[SEAL]

Attest:

DONALD J. QUIGG

Attesting Officer     Acting Commissioner of Patents and Trademarks